Aug. 17, 1943. A. ANDREWS 2,326,739
LAWN MOWER ATTACHMENT
Filed Sept. 15, 1942 2 Sheets—Sheet 1
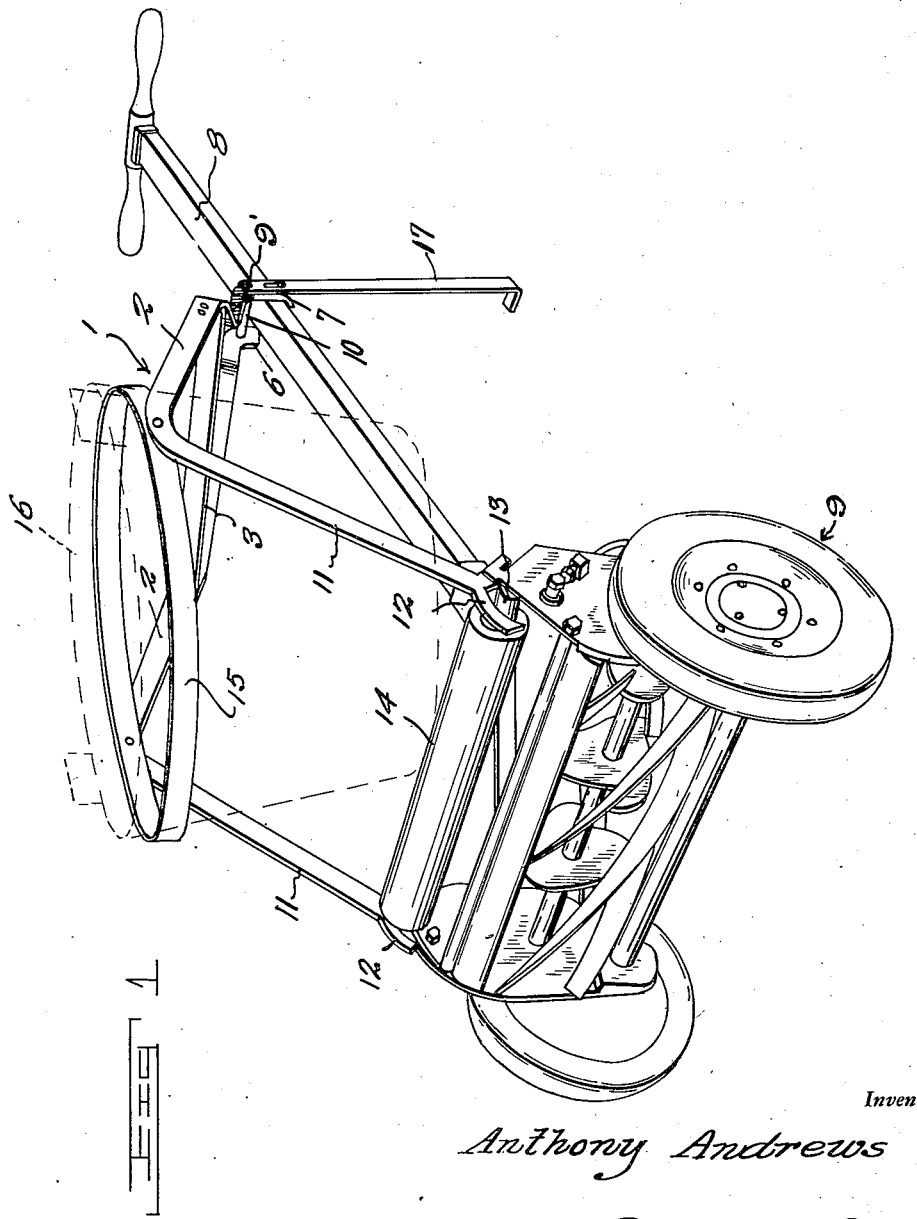
Inventor
Anthony Andrews
By Clarence A. O'Brien
and Harvey B. Jacobson
Attorneys

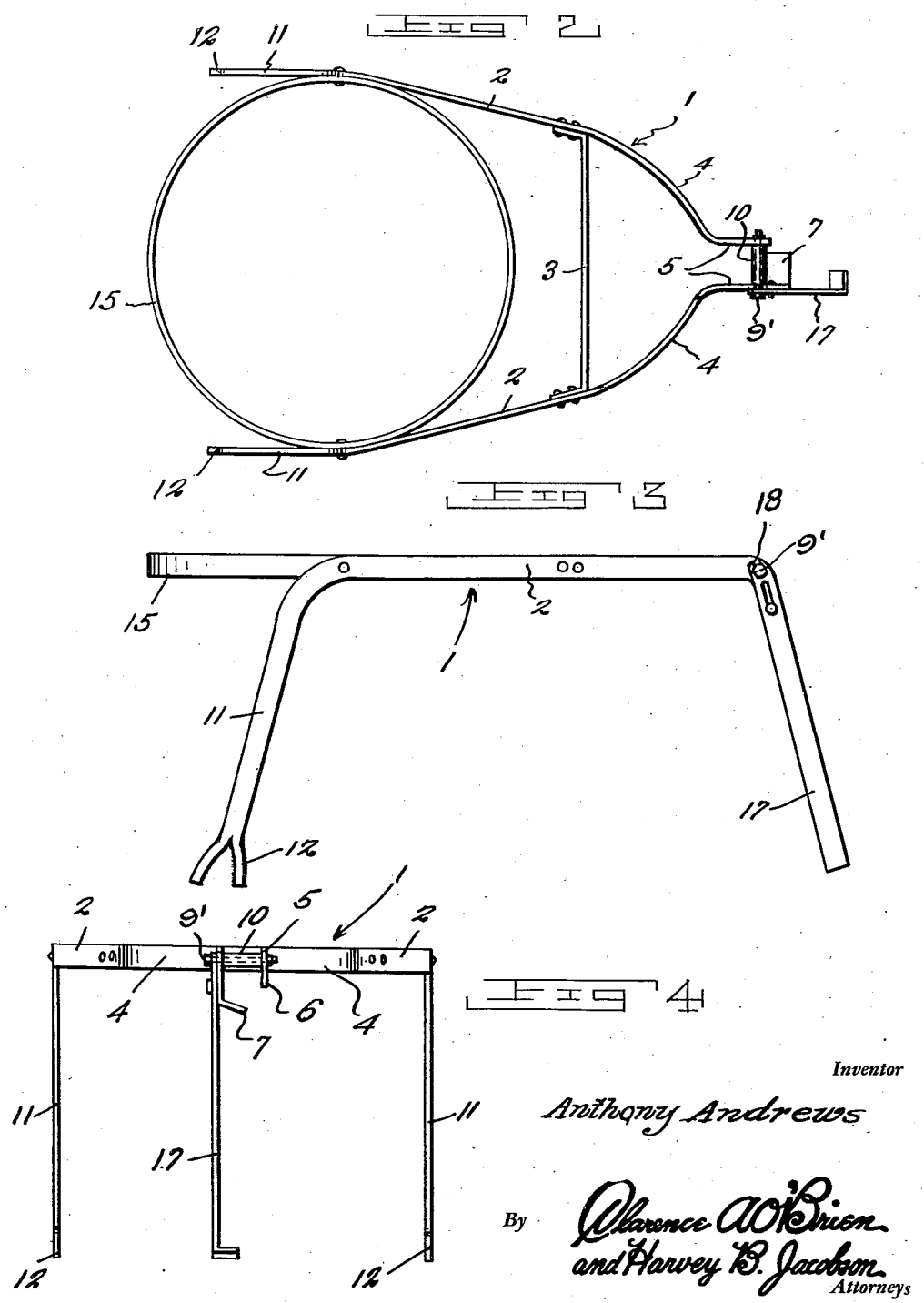

Patented Aug. 17, 1943

2,326,739

UNITED STATES PATENT OFFICE 2,326,739

LAWN MOWER ATTACHMENT

Anthony Andrews, Melrose Park, Ill.

Application September 15, 1942, Serial No. 458,415

2 Claims. (Cl. 56—249)

The present invention relates to new and useful improvements in lawn mower attachments, and has for its primary object to provide, in a manner as hereinafter set forth, means whereby a conventional mower may be expeditiously converted for use as a wheelbarrow for carrying grass, stones, dirt, et cetera.

Another very important object of the invention is to provide a lawn mower attachment of the aforementioned character comprising a novel construction and arrangement whereby the load may be conveniently dumped with a minimum of effort.

Still another very important object of the invention is to provide an attachment of the character described which may be expeditiously mounted for use on a conventional lawn mower without the necessity of making structural alterations therein.

Other objects of the invention are to provide a lawn mower attachment which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a perspective view, showing an attachment constructed in accordance with the present invention mounted in position on a lawn mower.

Figure 2 is a top plan view of the device.

Figure 3 is a side elevational view.

Figure 4 is a view in front elevation of the attachment.

Referring now to the drawings in detail, it will be seen that the embodiment of the invention which has been illustrated comprises a frame 1 of suitable metal. The frame 1 includes a pair of side bars 2 between which a brace 3 extends at an intermediate point. The side bars 2 comprise inwardly curved portions 4 which terminate in spaced, parallel rear end portions 5.

Depending from one of the portions 5 is a finger 6. Depending from the other portion 5 is a hook 7. The elements 6 and 7 receive the usual handle 8 of a conventional lawn mower 9 therebetween, said element 7 also engaging beneath said handle. A bolt 9' secures the rear end portions of the bars 2 in position on the handle 8. It will be observed that the bolt 9' clamps the elements 6 and 7 against the sides of the handle 8. A spacing sleeve 10 is provided between the rear end portions of the bars 2 on the bolt 9'.

The bars 2 further include inclined forward end portions 11. The portions 11 of the bars 2 terminate in forks 12 which straddle and rest on the spindles 13 of the ground roller 14 of the mower 9. Thus, the frame 1 is firmly but removably mounted on the mower 9. The attachment may be expeditiously mounted on substantially any width of mower by simply bending the portions 11 inwardly or outwardly to accommodate therebetween rollers 14 of different lengths.

Journaled for swinging movement between the bars 2 of the frame 1, forwardly of the brace 3 and at the angle of the portions 11 of said bars is a ring 15. The ring 15 is for the reception of a suitable removable receptacle, such, for example, as a standard size wood or steel bushel basket 16.

Pivotally and slidably mounted on the shank of the hook 7 is a supporting leg 17. The leg 17 is provided in its pivoted end portion with a notch or recess 18 for the reception of the bolt 9' for securing said leg in operative position.

It is thought that the manner in which the device is used will be readily apparent from a consideration of the foregoing. Briefly, the lawn mower 9 is turned over for disposing the roller 14 uppermost and the frame 1 is mounted in position. The basket or other receptacle 16 is then placed in the pivoted supporting ring 15. It will thus be seen that the basket 16 is suspended for swinging movement in a vertical plane in the frame 1 at a point adjacent the roller 14 of the mower. To dump or empty the basket 16 over the head of the mower, it is only necessary to elevate the handle 8 and swing the bottom of said basket rearwardly and upwardly.

It is believed that the many advantages of a lawn mower attachment constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A lawn mower attachment comprising a pair of side bars, a hook on one end of one of the side bars engageable with the handle of a mower, means for supporting the other ends of the side bars on the mower, a supporting leg pivotally and slidably mounted on the hook, and means for supporting a receptacle for swinging movement between the side bars.

2. A lawn mower attachment of the character described comprising a metallic frame including a pair of angular side bars, a brace extending between the side bars, forks on one end of the side bars adapted to straddle portions of a mower for supporting one end of the frame thereon, opposed elements on the other ends of the bars for receiving the handle of the mower therebetween, means for clamping said elements on the handle, a supporting leg pivotally and slidably mounted on one of the elements, and a ring, for the reception of a removable receptacle, pivotally mounted between the side bars forwardly of the brace.

ANTHONY ANDREWS